US012252924B2

(12) United States Patent
Dreyer et al.

(10) Patent No.: US 12,252,924 B2
(45) Date of Patent: Mar. 18, 2025

(54) BELT TENSIONING SYSTEM

(71) Applicant: Assa Abloy Entrance Systems AB, Landskrona (SE)

(72) Inventors: Roger Dreyer, Bjarred (SE); Simon Onnered, Lund (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 294 days.

(21) Appl. No.: 18/007,801

(22) PCT Filed: Jun. 3, 2021

(86) PCT No.: PCT/EP2021/064904

§ 371 (c)(1),
(2) Date: Dec. 2, 2022

(87) PCT Pub. No.: WO2021/245188

PCT Pub. Date: Dec. 9, 2021

(65) Prior Publication Data

US 2023/0220718 A1 Jul. 13, 2023

(30) Foreign Application Priority Data

Jun. 4, 2020 (SE) .................................... 2030186-7

(51) Int. Cl.
*E05F 15/643* (2015.01)

(52) U.S. Cl.
CPC ....... *E05F 15/643* (2015.01); *E05Y 2201/638* (2013.01); *E05Y 2201/672* (2013.01); *E05Y 2900/132* (2013.01)

(58) Field of Classification Search
CPC .............. E05F 15/643; E05F 2201/638; E05Y 2201/672
See application file for complete search history.

(56) References Cited

U.S. PATENT DOCUMENTS 5,659,160 A 8/1997 Tracey
2023/0003070 A1* 1/2023 Finke .................... E05F 15/643

FOREIGN PATENT DOCUMENTS

CN 111042698 4/2020
DE 19956536 7/2001
(Continued)

OTHER PUBLICATIONS

International Search Report and Written Opinion in PCT/EP2021/064904 mailed Sep. 13, 2021.
Swedish Search Report in 2030186-7 mailed Nov. 25, 2020.

*Primary Examiner* — Zakaria Elahmadi
*Assistant Examiner* — Gregory T Prather
(74) *Attorney, Agent, or Firm* — Wissing Miller LLP

(57) ABSTRACT

A belt tensioning system (170) for tensioning a belt (171) of a belt drive system (970) for transferring torque from a drive unit (112) of a door operating system (100) to a sliding door leaf (101) of a sliding door assembly (200), the belt tensioning system comprising a belt wheel (176) connectable to the belt (171) for torque transfer between said belt wheel (176) and an additional belt wheel (175) of the belt drive system (970); a belt wheel guiding arrangement (330), the belt wheel (176) being movably connected to said belt wheel guiding arrangement (330); and a belt tensioning arrangement (470) operatively connecting the belt wheel (176) and the belt wheel guiding arrangement (330) for adjusting the position of the belt wheel (176) relative the belt wheel guiding arrangement (330).

18 Claims, 3 Drawing Sheets

(56) References Cited

FOREIGN PATENT DOCUMENTS

| | | | | |
|---|---|---|---|---|
| EP | 0950788 | | 10/1999 | |
| EP | 2439369 | | 4/2012 | |
| EP | 3456910 | | 3/2019 | |
| FR | 2904651 | | 2/2008 | |
| GB | 2459964 A | * | 11/2009 | ............. B23D 47/12 |

* cited by examiner

BELT TENSIONING SYSTEM

This application is a 371 of PCT/EP2021/064904, filed on Jun. 3, 2021, published on Dec. 9, 2021 under publication number WO 2021/245188, which claims priority benefits from Swedish Patent Application No. 2030186-7, filed on Jun. 4, 2020, the disclosure of which is incorporated herein by reference.

TECHNICAL FIELD

The present invention relates to a belt tensioning system, a belt drive system comprising such a belt tensioning system, a door operating system comprises such a belt drive system and a sliding door assembly comprising such a door operating system.

BACKGROUND

The use of automatic opening and closing of sliding doors is commonly known to facilitate access to buildings, rooms and other areas. Conventional sliding doors are driven by a drive unit mounted at the door frame for driving a wagon along a rail via a driving belt. The wagon, in turn, is attached to the sliding door leaf, whereby the sliding door leaf is driven by the drive unit.

The driving belt has to be kept at a high tension at all times since loss of belt tension causes effect loss or in worst case that no torque can be transferred via the driving belt altogether.

Belt tension is strongly correlated to temperature since the belt and the support structure onto which the driven belt wheel is mounted has different temperature expansion properties. Thus, changes in temperature will quickly cause loss in belt tension.

In order for service personnel to adjust the belt tension, sliding door system are often equipped with a spring tensioned bolt tightened to a level indicated on a tension wheel device. However, the tensioning is time consuming and requires a trained professional in order to achieve the correct tensioning in a safe manner.

The inventors has realized that there is a need for improvement in this field.

SUMMARY

An object of the present invention is therefore to provide a solution to the above-mentioned problem, reducing the disadvantages of prior art solutions.

According to an aspect, a belt tensioning system for tensioning of a belt drive system for transferring from a drive unit of a door operating system to a sliding door leaf of a sliding door assembly is provided.

The belt tensioning system comprises a belt wheel connectable to the belt for torque transfer between said belt wheel and an additional belt wheel of the belt drive system and a belt wheel guiding arrangement. The belt wheel is movably connected to said belt wheel guiding arrangement.

The belt tensioning system further comprises a belt tensioning arrangement operatively connecting the belt wheel and the belt wheel guiding arrangement for adjusting the position of the belt wheel relative the belt wheel guiding arrangement.

The belt tensioning arrangement comprises an engagement member and a tensioning member. The engagement member comprises an eccentric cam structure and the tensioning member is arranged to engage said eccentric cam structure of the tensioning member. The engagement member and the tensioning member is adjustable relative each other to adjust the position of the belt wheel relative the belt wheel guiding arrangement.

According to an aspect, a belt drive system is provided. The belt drive system comprises the belt tensioning system according to the above, a belt and an additional belt wheel. The belt wheel is connected to the additional belt wheel by means of the belt.

According to an aspect, a door operating system is provided. The door operating system comprises a drive unit 112 and a belt drive system according to the above for transferring torque from the drive unit to a sliding door of a sliding door assembly.

According to an aspect, a sliding door assembly is provided. The sliding door assembly comprises at least one sliding door leaf and a door operating system according to the above adapted to operate said at least one sliding door leaf.

BRIEF DESCRIPTION OF THE DRAWINGS

Embodiments of the invention will be described in the following: reference being made appended drawings which illustrate non-limiting examples of how the inventive concept can be reduced into practice.

DETAILED DESCRIPTION OF EMBODIMENTS

Figure 1:
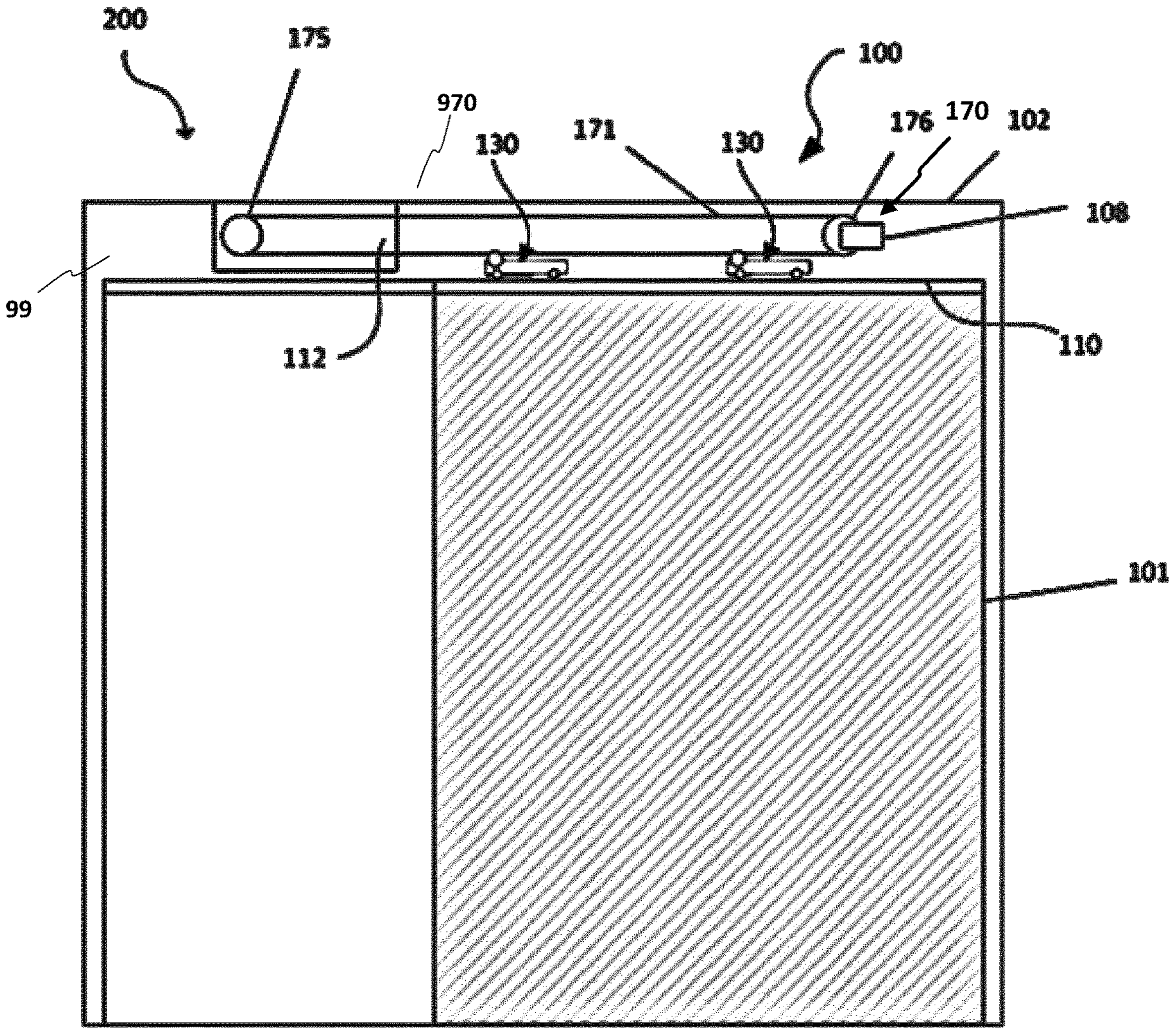
FIG. 1 is a front view of a sliding door assembly according to one embodiment.

An example of a door operating system 100 and a sliding door assembly 200 will be described in the following. With reference to FIG. 1, a sliding door assembly comprises a sliding door leaf 101, sliding door rail 110, and a door operating system 100 for operating the sliding door leaf 101. The door operating system 100 comprises a drive unit 112 for driving the sliding door leaf 101. The sliding door leaf 101 is driven by the drive unit 112 along the sliding door rail 110 which is fixed relative a door frame 102.

The sliding door leaf 101 is slidingly connected to the sliding door rail 110 for example by means of at least one wagon 130. The wagon 130 is preferably engaging with the sliding door rail 110 via at least one low friction wheel allowing the sliding door leaf 101 to move into a closed and open position along the horizontal sliding door rail 110.

Further referring to FIG. 1, the door operating system 100 may comprise the drive unit 112, which may be of any conventional type. Typically, the drive unit 112 comprises an electric motor and a reduction gearing providing the necessary torque to move the sliding door leaf 101 between the open and closed position. According to the present example, a belt drive arrangement connects the drive unit 112 with the wagon 130, which works as a drive member. Advantageously, the drive unit 112 is adapted to be connected to the door frame 102 of the sliding door assembly, or even mounted within the interior of the upper part of the door frame 110. The door operating system 100 may thus be mounted to a support structure 99 of the sliding door assembly 200.

The door operating system 100 may comprise a belt drive system 970. The belt drive system comprises a belt wheel 176, an additional belt wheel 175 and a belt 171. The belt 171 connects the belt wheel 176 and the additional belt wheel 175 for torque transfer between said belt wheel 176 and the additional belt wheel 175. The belt drive system 970 is configured to be driven by the drive unit 112. The belt 176 may be defined as a first belt wheel, whereby the additional belt wheel 175 may be defined as a second belt wheel 175.

The wagon 130 is connected to the belt 171 for transfer of torque from the belt drive system 970 to the sliding door leaf 101. Hence, the belt 171 is configured to be mounted to the sliding door leaf 101.

The belt 171 is preferably a synchronous endless drive belt extending between the belt wheel 176 and the additional belt wheel 175. In one embodiment, the additional belt wheel 175 is directly driven by the drive member 112 and the second belt wheel 176 is rotationally supported by a console 108 being fixed to the door frame 102. The belt wheel 176 and the additional belt wheel 175 may be cogged wheels. The drive belt 171 may accordingly be a cogged belt.

Typically, the door frame 102 comprises the support structure 99. The support structure 99 may be a top beam. The top beam may extend above the sliding door leaf 101. The belt tensioning system 170 as well as the door operating system 100 may be mounted to said top beam 99.

Accordingly, the belt wheel 176 and the additional belt wheel 175 are rotatably coupled to the top beam 99. In most cases, the top beam 99 and the belt 171 are made of different materials. For example, the top beam 99 may be in aluminum and the belt 171 is often in a material at least comprising steel, i.e. a steel-reinforced material. Thus, if the sliding door assembly is subjected to changes in temperature, the difference in thermal expansion properties between the top beam 99 and the belt 171 will cause the belt 171 to loose tension due to the top beam 99 and the belt 171 expanding differently.

According to the invention, this may be addressed by means of having the belt wheel 176 comprised in a belt tensioning system, which will be further described with reference to FIG. 2-4.

Figure 2:
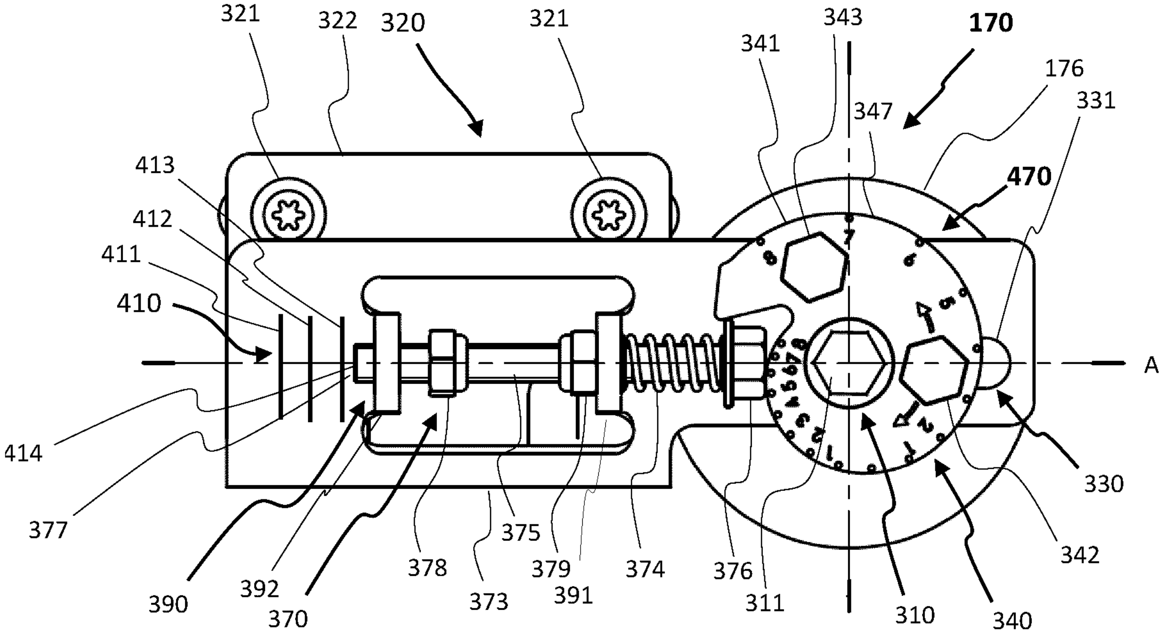
FIG. 2 is a front view of a belt tensioning system according to one embodiment.

FIG. 2 depicts a front view of the belt tensioning system 170 for tensioning the belt 171 of the belt drive system described with reference to FIG. 1.

The belt tensioning system 170 comprises the belt wheel 176. The belt wheel 176 is connectable to the belt and the additional belt wheel of belt drive system described with reference to FIG. 1.

The belt tensioning system 170 comprises a belt wheel guiding arrangement 330. The belt wheel 176 is movably connected to the belt wheel guiding arrangement 330. Hence, the belt wheel guiding arrangement 330 is arranged to accommodate adjustment of the position of the belt wheel 176 relative said belt wheel guiding arrangement 330. Worded differently, the belt wheel guiding arrangement 330 is arranged to accommodate adjustment of the belt wheel 176 relative the additional belt wheel 175

Further, the belt tensioning system 170 comprises a belt tension arrangement 470 for adjusting the position of the belt wheel 176 relative the belt wheel guiding arrangement 330 (and the additional belt wheel 175). The belt tension arrangement 470 operatively connects the belt wheel 176 and the belt wheel guiding arrangement 330. Accordingly, the belt tensioning arrangement 470 is arranged between the belt wheel 176 and the belt wheel guiding arrangement 330.

The belt tensioning arrangement comprises an engagement member 340 and a tensioning member 370. The engagement member 340 comprises an eccentric cam structure 341. The tensioning member 370 is arranged to engage said eccentric cam structure 341 of the engagement member 340. Thus, the tensioning member 370 is arranged to be in contact with said eccentric cam structure 341.

The engagement member 340 and the tensioning member 370 are adjustable relative to each other to adjust the position of the belt wheel 176 relative the belt wheel guiding arrangement 330. Thus, the point(s) of engagement between the engagement member 340 and the tensioning member 370 on the eccentric cam structure 341 is adjustable such that relative adjusting of the tensioning member 370 and the engagement member 340 causes adjustment of the position of the belt wheel 176 relative the belt wheel guiding arrangement 339. Accordingly, the engagement member 340 and the tensioning member 370 may be selectively movable relative to each other.

The belt tensioning system according to the above may thus be operated in a user friendly manner simply by adjusting the belt tensioning arrangement compared to a conventional belt tensioning system where the user have to use particular tools and follow a hard to interpret scale in order to set the correct tension by means of incremental turning of multiple adjustment screws. The tensioning system according to the invention may simplify this process by enabling usage of a suitable eccentric cam structure guiding the user to the correct tension.

The tensioning of the belt 171 may be achieved by rotation of the engagement member 340 due to the tensioning member engaging the eccentric cam structure 341. The rotation of the engagement member 340 causes the belt wheel 176 to move relative the belt wheel guiding arrangement 330. Hence, the engagement member 340 is adjustable relative the tensioning member 370 by means of rotation of said engagement member 340. In one embodiment, the eccentric cam structure 341 is formed by an eccentric disc 347. In one embodiment, the engagement member 340 is adjustable relative the tensioning member 370 by means of rotation of said eccentric disc 347.

As is recognizable by the skilled person, the positioning of the engagement member and the tensioning member may be possible to alter. In one embodiment, the engagement member 340 is operatively connected to the belt wheel 176 and the tensioning member 370 is operatively connected to the belt wheel guiding arrangement 330. Thus, the engagement member 340 may be mounted to the belt wheel 176. The belt wheel 176 may be rotatable relative said engagement member 340. This allows for a less complex and more intuitive to use belt tensioning system. However, in an alternative embodiment, the tensioning member 370 may be operatively connected to the belt wheel 176 while the engagement member is operatively connected to the belt wheel guiding arrangement 330.

The belt tension system 170 may comprise a mounting portion 320. The mounting portion 320 is arranged to be mounted to a support structure 99 of the sliding door assembly 200 (shown in FIG. 1). The mounting portion 320 may be arranged to be mounted to the support structure by means of fastening elements 321.

The belt wheel guiding arrangement 330 is fix relative a support structure of the sliding door assembly. The belt wheel guiding arrangement 330 may be connected to, e.g. fix to, the mounting portion 320. Thus, the belt wheel guiding arrangement 330 may be arranged to be mounted to the support structure 99 by means of the mounting portion 320.

The belt wheel guiding arrangement 390 is arranged to allow movement of the belt wheel 176 along a tensioning axis A. The tensioning axis A extends parallel with the belt.

In one embodiment, the belt tensioning system comprises a first plate element 373. The first plate element is connected to the mounting portion 320. The first plate element 373 extends along the tensioning axis A. The first plate element 373 may comprise the belt wheel guiding arrangement 390.

In one embodiment, the belt tensioning system 170 may further comprise a fixating member 310. The fixating member 310 is adapted to releasably fixate the position of the belt wheel 176 relative the belt wheel guiding arrangement 330. Thus, once the position of the belt wheel 176 has been adjusted, the belt wheel 176 may be fixated in the adjusted position relative the belt wheel guiding arrangement 330. In order to allow for adjustment, the fixating member may be released. Releasable may herein refer to disengageable, i.e. arranged to be in an engaged position and a disengaged position.

The fixating member 310 may be arranged to releasably fixate the engagement member 340 relative the tensioning member 370. Thus, the fixation of the position of the engagement member and the securing of the position of the belt wheel may be performed in one operation, allowing for a more user-friendly and time efficient belt tensioning system. In one embodiment, the fixating member 310 may be arranged to releasably fixate the engagement member 340 to belt wheel guiding arrangement 330.

The fixating member 310 will later be further described with reference to FIG. 3.

Further referencing FIG. 2, the tensioning member 370 may be biased against the engagement member 340. This ensures that the engagement between the engagement member and the tensioning member is maintained. Further, it allows for adjusting of the tension in the belt without manually setting up the tensioning member relative the engagement member each time. Accordingly, the tensioning member 370 is adjustable relative the engagement member 340 at least by means of being biased against said engagement member 340.

Biased against herein refers to the tensioning member 370 being spring-loaded to exert a contact force onto the eccentric cam surface 341 of the engagement member 340.

The tensioning member 370 may comprise a tensioning element 375. The tensioning element 375 may be an elongated element such as a screw.

A first end 376 of said tensioning element may be arranged to engage the engagement member 340.

The belt tensioning system 170 may further comprise a tensioning guide arrangement 390. The tensioning guide arrangement 390 is adapted to guide movement of the tensioning element 375 relative the engagement member 340.

The tensioning guide arrangement may be fix relative the mounting portion 320. In an alternative embodiment, said tensioning guide arrangement may be arranged to be directly fixated to the support structure of the sliding door assembly.

In one embodiment, the tensioning element 375 may be connected to the tensioning guide arrangement 390 by means of a spring 374. Said spring 374 being arranged to bias the tensioning element 375 against the engagement member 340. A first end of the spring 374 may be connected to the first end 376 of the tensioning element 375. A second end of the spring 374 may be connected to the tensioning guide arrangement 390.

The tensioning element 375 may extend along the tensioning axis A. The tensioning element 375 may be movable along said tensioning axis A. The spring 374 may be coaxial to said tensioning element 375. The tensioning axis A may be aligned with the eccentric cam structure 341 of the engagement member 340 such that the tensioning element 375 engages the eccentric cam structure 341. Accordingly, the eccentric outer surface of the eccentric cam structure 341 may extend orthogonally to the tensioning axis A.

The tensioning element 375 may comprise a second end 377. Said second end 377 is opposite to the first end 376. The second end 377 may be a guided by means of the tensioning guide arrangement 390. The second end 377 may be a free end of the tensioning element 375.

As depicted in FIG. 1, the belt tensioning system 170 may further comprise a tensioning indicating arrangement 410. The tensioning indicating arrangement 410 is intended for providing an indication on the tension of the belt to a user.

Accordingly, the tension indicating arrangement 410 is arranged to indicate at least one predefined position of a reference point 414 of the tensioning element 375 relative the engagement member 340. Each of the at least one predefined position is associated with a corresponding position of the belt wheel 176 relative the belt wheel guiding arrangement 330.

The reference point may be the second end 377 or an arbitrary chosen point along the tensioning element 375. By using the tension indicating arrangement, the service personnel is directly informed regarding suitable positions of the belt wheel. Said suitable positions may be chosen to accommodate for different tensions of the belt. The service personnel may thus adjust the engagement member and the tensioning member according to a predefined position of the reference point of the tensioning element indicated by the tensioning indicating arrangement.

The tensioning indicating arrangement may comprise a set of indicators of predefined positions along the tensioning axis A. Said set of indicators may comprise a scale with markings 411, 412, 413 indicating said predefined positions.

The tensioning indicating arrangement may be positioned proximal to the tensioning element 375. In one embodiment, the tensioning indicating arrangement is positioned on the tensioning guide arrangement 390 or the mounting portion 320. Preferably however, the tensioning indicating arrangement 410 is positioned on the first plate element 373, preferably proximal to the tensioning member 370.

The tensioning member 370 may comprise an adjustment element 379 adapted to adjust the biasing of said tensioning member 370, i.e. adjusting tension of the spring 374. Thus, the force which the tensioning member is engaging the engagement member may be adjusted by means of said adjustment element. This allows for a more robust and reliable belt tensioning system less susceptible to wear or failure due to the engagement member and the tensioning member coming out of engagement.

The adjustment element 379 may be arranged adjacent to an adjustment flange 391 of the tensioning guide arrangement. The adjustment flange 391 comprises an aperture for movably receiving the tensioning element 375.

In one embodiment, the spring 374 is mounted to the adjustment flange 391 and the first end 376 of the tensioning element 375. In one embodiment, the tensioning element 375 comprises a threaded portion, whereby the adjustment element 379 is mounted to said threaded portion for adjusting the tension of the spring 374 relative the adjustment flange 391. The adjustment element 379 may be a nut.

The tensioning element 375 may comprise a head portion. The first end 376 may be said head portion. The head portion may protrude radially from the tensioning axis A relative an intermediate portion of the tensioning member 375 to prevent passage of the first end through the aperture of the adjustment flange 391.

In one embodiment, the tensioning guide arrangement 390 may comprise a stop flange 392. Said stop flange 392 may comprise an aperture for movably receiving the tensioning member 375. The stop flange 392 is arranged along the tensioning axis A distant from the engagement member 340 relative the adjustment flange 391. The tensioning member 370 may comprise a stop element 378. The stop element 378 may protrude radially from the tensioning axis A relative the tensioning member 375 to prevent passage of the tensioning member 375 through the aperture of the stop flange 392 beyond said stop element 378.

In one embodiment, the stop element 378 is mounted to the threaded portion of the tensioning element 375 for adjusting the position of the stop element 378 relative the tensioning element 375 along the tensioning axis A. The stop element 378 may be a nut.

In one embodiment, the first plate element 373 may comprise the tensioning guide arrangement 390. The stop flange 392 and/or the adjustment flange 391 may accordingly form protruding portions of said first plate element 373.

Thus, the tensioning member 370 is movably connected to said first plate element 373. Further, the belt wheel 176 the belt wheel 176 may be rotatably and movably connected to said first plate element 373 by means of the belt wheel guiding arrangement 330.

As depicted in FIG. 2, the belt wheel guiding arrangement 330 comprises an elongated recess 331 for receiving a guiding member connected to the belt wheel 176 for guiding the belt wheel 176. The elongated recess may extend along the tensioning axis A. The guiding member may thus extend orthogonally to the tensioning axis A and through the elongated recess 331. The belt wheel 176 is thus movably connected to the elongated recess 331 by means of said guiding member. The first plate element 373 may comprise the belt wheel guiding arrangement and said elongated recess 331.

The skilled person realizes that the belt wheel guiding arrangement 330 may be arranged in different manners allowing for guided movement of the belt wheel 176. In alternative embodiment, the belt wheel 176 may be mounted to a movable console slidably connected to a track forming the guide arrangement.

Figure 3:
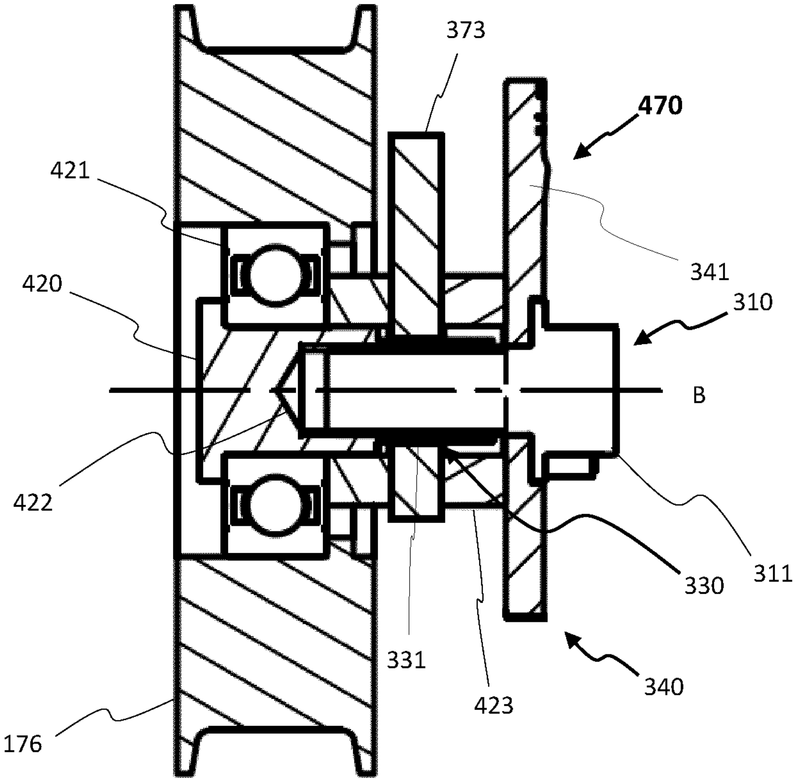
FIG. 3 is a cross-section view of a part of a belt tensioning system according to one embodiment.

Turning to FIG. 3, a cross-section view of a part of the belt tensioning system is depicted. The belt wheel 176 is rotatable about a belt wheel axis B. The belt wheel axis B extends orthogonally to the tensioning axis A described with reference to FIG. 1.

As seen in said FIG. 3, the fixating member 310 comprises a fixating element 311, such as a screw member. The fixating element 311 may be rotatably coupled to the belt wheel 176. The fixating element 311 may extend through the belt wheel guiding arrangement 330 and the engagement member 340. Upon tightening of the fixating element 311, the engagement member 340 is locked into position and the position of the belt wheel 176 is fixated relative the belt wheel guiding arrangement 330. Upon loosening of the fixating element 311 the engagement member is rotatable relative the fixating element 311 and the belt wheel 176 is movable relative the belt wheel guiding arrangement 330.

This allows for a less complex tensioning, since the fixating element allows may secure or enable the positioning of both the belt wheel and the engagement member only by one action.

The fixating element 311 may constitute the guide member guided in the elongated recess 331. The elongated recess 331 may thus be adapted to receive a portion of the fixating element 311 for guiding the belt wheel 176.

The engagement member 340 may thus comprise a through-hole for receiving the fixating element 311. The through-hole may be aligned with the belt wheel axis B.

The fixating element 311 may extend along the belt wheel axis B. The fixating element 311 may be rotatably coupled to the belt wheel 176 by means of a bearing 421 comprising bearing mounting 420 adapted to receive said fixating element 311. The fixating element 311 is fixedly connected to the bearing mounting and the bearing 421 is adapted to allow relative rotation between the fixating element 311 and the belt wheel 176.

The fixating element 311 may extend through the first plate element 373 by means of extending through the elongated recess 331 of the belt wheel guiding arrangement 330 of said first plate element 373. Thus, fixation of the fixating member 310 fixates the engagement member 340 to the first plate element 373 and fixates the positon of the belt wheel 176 relative the first plate element 373.

In one embodiment, the belt tensioning system may further comprise a distance element 423 arranged between engagement member 340 and the first plate element 373 along the belt wheel axis B. This ensures proper alignment between the tensioning member and the engagement member. The fixating element 311 may extend through said distance element 423. The distance element 423 may be an annular distance element.

Figure 4:
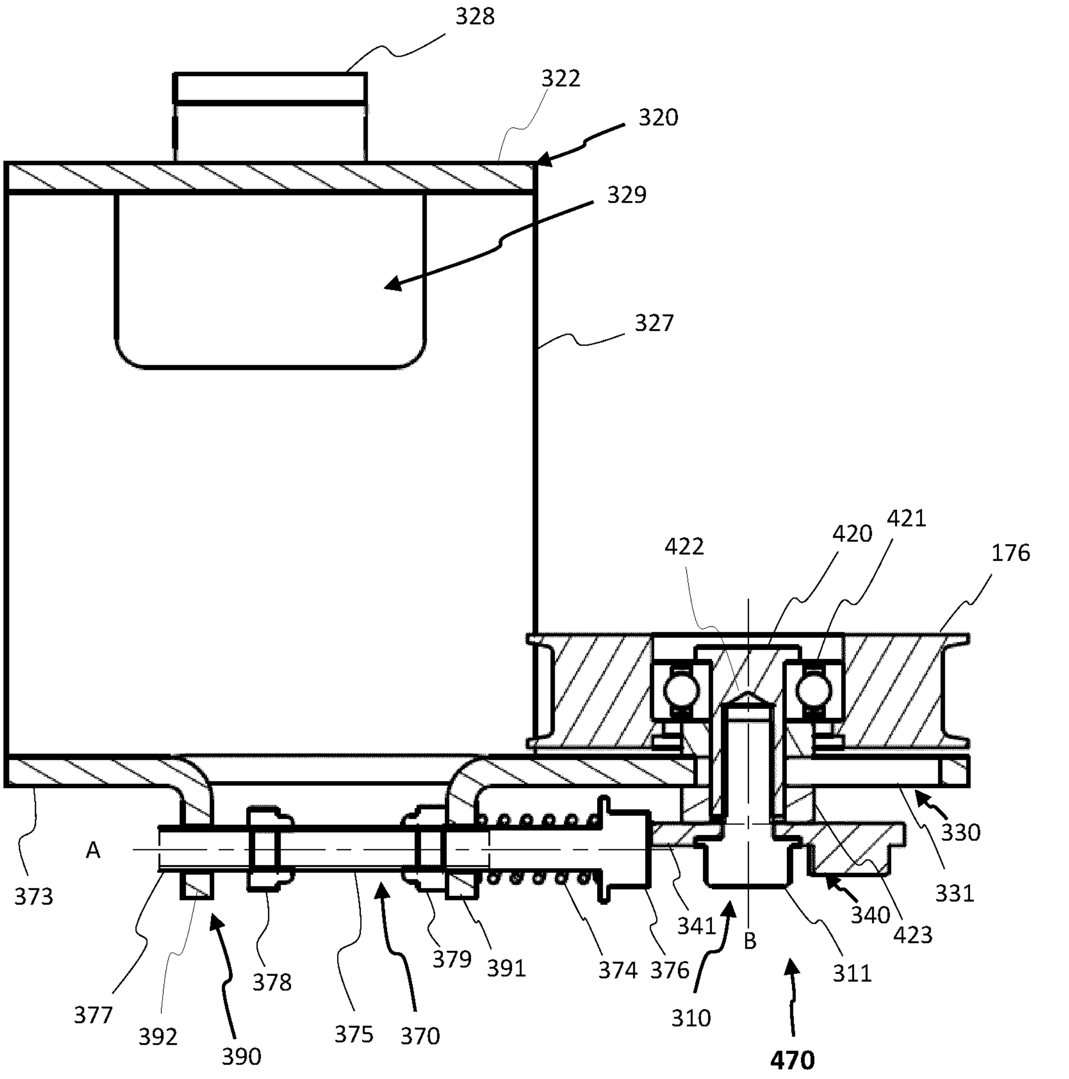
FIG. 4 is a top view of a belt tensioning system according to one embodiment.

Referencing FIG. 4, a top view of the belt tensioning system is depicted. The belt tensioning system 170 may further comprise a retention heel 328. The retention heel 328 may protrude from the mounting portion 320. The retention heel 328 is arranged to engage a corresponding surface of the sliding door assembly 200. This allows for a more stable mounting of the belt tensioning system.

The belt tensioning system may further comprise a second plate element 327. The second plate element 327 may interconnect the first plate element 373 and the mounting portion 320. The second plate element 327 may extend along the tensioning axis A.

In one embodiment, the second plate element 327 may be orthogonal to the first plate element 373 and the mounting portion 320. The mounting portion 320 and the first plate element 373 may be parallel. Preferably, the mounting portion 320 and the first plate element 373 are arranged to be parallel to the at least one sliding door leaf of the sliding door assembly.

In one embodiment, the first and second plate element and the mounting portion may be in aluminum.

According to an aspect, a belt drive system 970 is provided. The belt drive system 970 comprises the belt tensioning system 170 according to any of the previously described embodiments, the belt 171 and the additional belt wheel 175. The belt wheel 176 of the belt tensioning system 170 is connected to the additional belt wheel 175 by means of the belt 171.

According to an aspect, a door operating system 100 is provided. The door operating system 100 comprises the drive unit 112. The door operating system 100 comprises the belt drive system 970 for transferring torque from the drive unit 112 of said door operating system 100 to a sliding door leaf 101 of the sliding door assembly 200.

According to an aspect, a sliding door assembly 200 is provided. The sliding door assembly comprises the at least one sliding door leaf 101 and the door operating system 100. The door operating system is adapted to operate said at least one sliding door leaf 101.

According to an aspect, a method for adjusting the tension of the belt in a belt drive system 970 according to the above is provided. The method comprises adjusting the engagement member 340 and the tensioning member 370 relative each other to adjust the position of the belt wheel 176 relative the belt wheel guiding arrangement 330.

The method may further comprise fixating the position of the belt wheel 176 relative the belt wheel guiding arrangement 330 by means of the fixating member 310.

The method may further comprise fixating the engagement member 340 relative the tensioning member 370 by means of the fixating member 310.

It should be appreciated that even though numerous characteristics and advantages of the present invention have been set forth in the foregoing description, together with details of the structure and function of the invention, the description is only illustrative and changes may be made in detail, especially in matters of shape, size and arrangement of parts within the scope of the invention to the full extent indicated by the appended claims.

The invention claimed is:

1. A belt tensioning system (170) for tensioning a belt (171) of a belt drive system (970) for transferring torque from a drive unit (112) of a door operating system (100) to a sliding door leaf (101) of a sliding door assembly (200), the belt tensioning system comprising:

- a belt wheel (176) connectable to the belt (171) for torque transfer between said belt wheel (176) and an additional belt wheel (175) of the belt drive system (970);
- a belt wheel guiding arrangement (330), the belt wheel (176) being movably connected to said belt wheel guiding arrangement (330); and
- a belt tensioning arrangement (470) operatively connecting the belt wheel (176) and the belt wheel guiding arrangement (330) for adjusting the position of the belt wheel (176) relative the belt wheel guiding arrangement (330),
- wherein the belt tensioning arrangement (470) comprises an engagement member (340) and a tensioning member (370), whereby the engagement member (340) comprises an eccentric cam structure (341) and the tensioning member (370) is arranged to engage said eccentric cam structure (341) of the engagement member (370), the engagement member (340) and the tensioning member (370) being adjustable relative each other to adjust the position of the belt wheel (176) relative the belt wheel guiding arrangement (330), and wherein the engagement member (340) is mounted to the belt wheel (176) and the belt wheel (176) is rotatable relative said engagement member (340).

2. The belt tensioning system (170) according to claim 1, further comprising a fixating member (310) adapted to releasably fixate the position of the belt wheel (176) relative the belt wheel guiding arrangement (330).

3. The belt tensioning system (170) according to claim 2, wherein the fixating member (310) is arranged to releasably fixate the engagement member (340) relative the tensioning member (370).

4. The belt tensioning system (170) according to claim 2, wherein the fixating member (310) comprises a fixating element (311) rotatably coupled to the belt wheel (176), said fixating element (311) extending through the belt wheel guiding arrangement (330) and the engagement member (340).

5. The belt tensioning system (170) according to claim 4, wherein the belt wheel guiding arrangement (330) comprises an elongated recess (331) adapted to receive a portion of the fixating element (311) for guiding the belt wheel (176).

6. The belt tensioning system (170) according to claim 1, wherein the tensioning member (370) is biased against the engagement member (340).

7. The belt tensioning system (170) according to claim 1, wherein the tensioning member (370) comprises a tensioning element (375), wherein a first end (376) of said tensioning element (375) is arranged to engage the engagement member (340).

8. The belt tensioning system (170) according to claim 7, further comprising a tensioning guide arrangement (390) adapted to guide movement of the tensioning element (375) relative the engagement member (340).

9. The belt tensioning system (170) according to claim 8, further comprising a tensioning indicating arrangement (410) arranged to indicate at least one predefined position of a reference point (414) of the tensioning element (375) relative the engagement member (340), each of the at least one predefined position being associated with a corresponding position of the belt wheel (176) relative the belt wheel guiding arrangement (330).

10. The belt tensioning system (170) according to claim 1, further comprising a mounting portion (320) arranged to be mounted to a support structure (99) of the sliding door assembly (200).

11. The belt tensioning system (170) according to claim 10, further comprising a retention heel (328) protruding from the mounting portion (320), the retention heel (328) being arranged to engage a corresponding surface of the support structure (99) of the sliding door assembly (200).

12. The belt tensioning system (170) according to claim 1, wherein the eccentric cam structure (341) is formed by an eccentric disc (347), whereby the engagement member (340) is adjustable relative the tensioning member (370) by means of rotation of said eccentric disc (347).

13. A belt drive system (970) comprising a belt tensioning system (170) according to claim 1, the belt (171) and an additional belt wheel (175), whereby the belt wheel (176) of the belt tensioning system (170) is connected to the additional belt wheel (175) by means of the belt (171).

14. A door operating system (100) comprising a drive unit (112) and a belt drive system (970) according to claim 13 for transferring torque from the drive unit (112) to the sliding door leaf (101) of the sliding door assembly (200).

15. A sliding door assembly (200) comprising the sliding door leaf (101) and the door operating system (100) according to claim 14 adapted to operate said sliding door leaf (101).

16. A method for adjusting the tension of the belt in a belt drive system (970) according to claim 13, the method comprising adjusting the engagement member (340) and the tensioning member (370) relative each other to adjust the position of the belt wheel (176) relative the belt wheel guiding arrangement (330).

17. The method according to claim 16, further comprising fixating the position of the belt wheel (176) relative the belt wheel guiding arrangement (330) by means of the fixating member (310).

18. The method according to claim 17, further comprising fixating the engagement member (340) relative the tensioning member (370) by means of the fixating member (310).

* * * * *